United States Patent
Chin

(10) Patent No.: US 7,630,781 B2
(45) Date of Patent: Dec. 8, 2009

(54) MEDIA DATA REPRODUCTION METHODS AND EMBEDDED SYSTEMS UTILIZING THE SAME

(75) Inventor: Brian Chin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 904 days.

(21) Appl. No.: 11/183,352

(22) Filed: Jul. 18, 2005

(65) Prior Publication Data

US 2006/0167575 A1    Jul. 27, 2006

(30) Foreign Application Priority Data

Jan. 27, 2005    (TW) ............... 94102443 A

(51) Int. Cl.
 *G06F 17/00*    (2006.01)
(52) U.S. Cl. .......................... 700/94; 704/270
(58) Field of Classification Search ............ 700/94
 See application file for complete search history.

(56) References Cited

U.S. PATENT DOCUMENTS

| | | | | |
|---|---|---|---|---|
| 5,911,082 A * | 6/1999 | Monroe et al. | ............... | 712/35 |
| 5,951,633 A * | 9/1999 | Polcyn | ............... | 718/104 |
| 6,044,396 A * | 3/2000 | Adams | ............... | 725/95 |
| 6,167,054 A * | 12/2000 | Simmons et al. | ............... | 370/422 |
| 6,792,468 B1 * | 9/2004 | Bloch et al. | ............... | 709/231 |
| 7,110,913 B2 * | 9/2006 | Monroe et al. | ............... | 702/179 |
| 7,143,128 B1 * | 11/2006 | Baweja et al. | ............... | 709/201 |
| 7,145,872 B1 * | 12/2006 | Kim | ............... | 370/230 |
| 7,181,572 B2 * | 2/2007 | Walmsley | ............... | 711/128 |
| 7,301,906 B2 * | 11/2007 | Nation et al. | ............... | 370/235 |
| 2002/0116382 A1 * | 8/2002 | Koyama et al. | ............... | 707/9 |
| 2002/0152305 A1 * | 10/2002 | Jackson et al. | ............... | 709/224 |
| 2003/0140179 A1 * | 7/2003 | Wilt et al. | ............... | 709/321 |
| 2004/0047354 A1 * | 3/2004 | Slater et al. | ............... | 370/400 |
| 2004/0153867 A1 * | 8/2004 | McAlinden et al. | ............... | 714/47 |
| 2005/0005019 A1 * | 1/2005 | Harville et al. | ............... | 709/231 |
| 2005/0147033 A1 * | 7/2005 | Chin et al. | ............... | 370/229 |
| 2005/0192975 A1 * | 9/2005 | Reiner et al. | ............... | 707/100 |
| 2005/0234571 A1 * | 10/2005 | Holmes | ............... | 700/94 |

FOREIGN PATENT DOCUMENTS

TW    535050    1/2001

* cited by examiner

*Primary Examiner*—Huyen D Le
*Assistant Examiner*—Paul McCord
(74) *Attorney, Agent, or Firm*—Thomas, Kayden, Horstemeyer & Risley

(57) ABSTRACT

A media data reproduction method is implemented in an embedded system comprising a media reader, a storage device, and a converter. First, a reproduction request is received. Media data is automatically copied from storage media read by the media reader to the storage device in response to the reproduction request. The converter converts the copied media data in the storage device to a new format. During conversion of the copied media data, system resources of the embedded system occupied by modules other than the converter are detected. The workload of converting the copied media data is dynamically adjusted based on the detected system resources to ensure that system resources utilized by the converter do not exceed system resources unused by modules other than the converter.

18 Claims, 4 Drawing Sheets

MEDIA DATA REPRODUCTION METHODS AND EMBEDDED SYSTEMS UTILIZING THE SAME

BACKGROUND

The invention relates to computer techniques, and in particular, to media data format conversion.

Popular music players presently can play Windows Media Audio (wma), Moving Pictures Experts Group Audio Layer 3 (MPEG3 or mp3) files, wave files (not compressed format) and other types. Compressed audio files or other media data are typically small in size and can be stored in a mass storage device rather than compact discs (CDs). Thus, music players implemented in embedded systems are increasingly provided with mass storage devices, such as hard disks drives.

Conversion of raw data from CD to mp3, wma files, or other compressed files is often referred to as ripping. The ripping process comprises reading, compressing, and storing compressed data, which is a time-consuming operation. Embedded systems generally have less computability and memory capacity than Personal Computers (PCs), so CD ripping on embedded systems is more time consuming and may affect music playback.

SUMMARY

Accordingly, methods and systems of data conversion are provided. An exemplary embodiment of such a method is implemented in an embedded system comprising a media reader, a storage device, and a converter. In the method, a reproduction request is received. Media data is automatically copied from storage media, read by the media reader, to the storage device in response. The converter converts the copied media data in the storage device to a new format. During conversion, system resources of the embedded system occupied by modules other than the converter are detected. The conversion workload is dynamically adjusted based on the detected system resources to ensure that system resources utilized by the converter do not exceed those unused by modules other than the converter. Thus, the performance of a music player of the embedded system is prevented from influencing conversion.

An exemplary embodiment of an embedded system comprises a media reader, a storage device, a control module receiving a reproduction request, a duplication module, a converter, and a resource detector. The duplication module automatically copies media data from storage media read by the media reader to the storage device in response. The converter converts the copied media data in the storage device to a new format. The resource detector detects system resources of the embedded system occupied by modules other than the converter during conversion. The converter dynamically adjusts the workload of conversion based on the detected system resources to ensure that system resources utilized by the converter do not exceed those unused by modules other than the converter. Thus, the performance of a music player of the embedded system is prevented from influencing conversion.

DESCRIPTION OF THE DRAWINGS

The invention can be more fully understood by reading the subsequent detailed description and examples with references made to the accompanying drawings, wherein.

DETAILED DESCRIPTION

Figure 1:
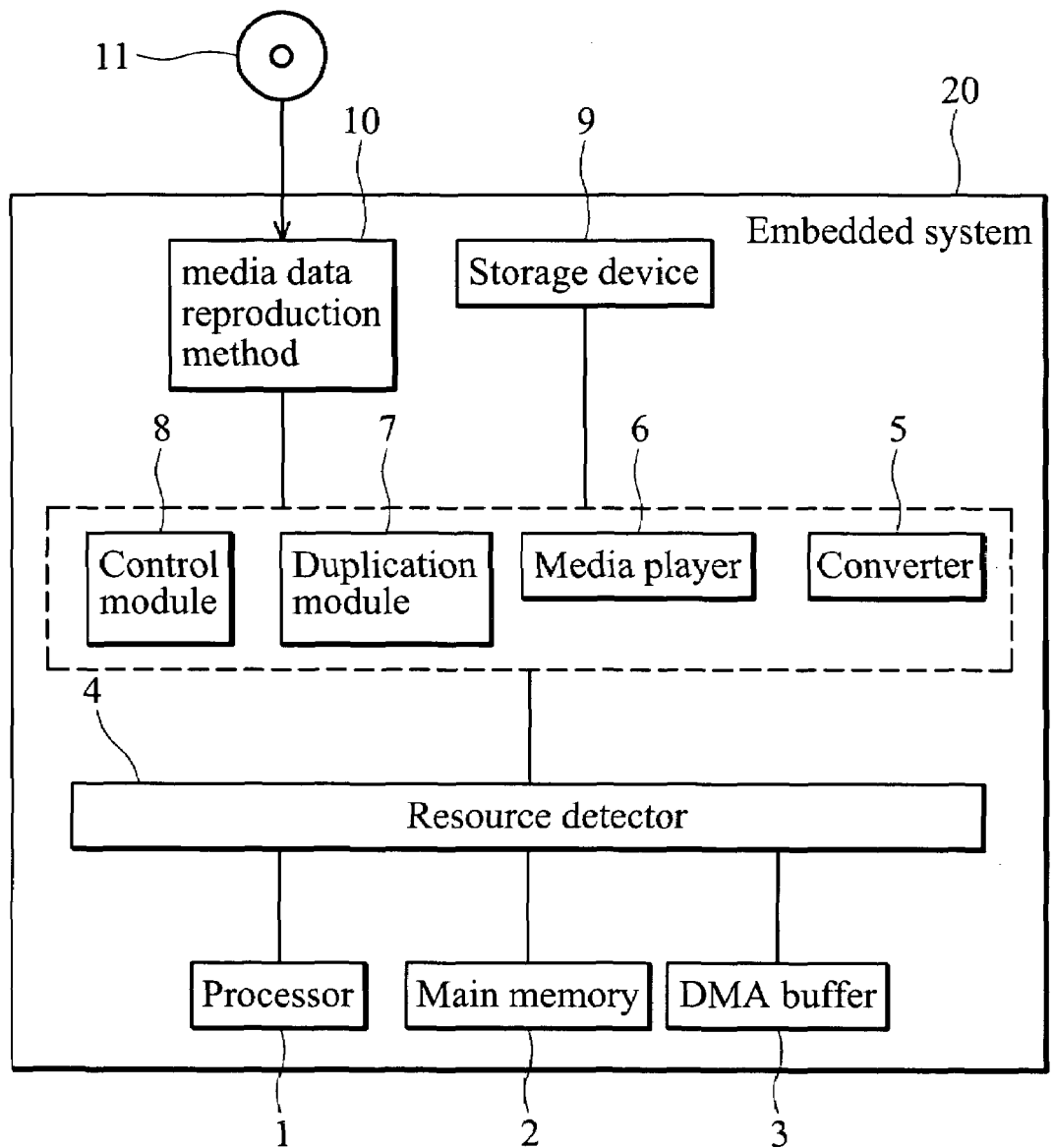
FIG. 1 is a block diagram of configuration of an exemplary embodiment of an embedded system.

Media data reproduction methods and embedded systems utilizing the same are provided.

A media data reproduction method is implemented in embedded system 20, which may be a jukebox, other music player, or media data playback devices. Processor 1 may be an ARM9TDMI microprocessor. Media reader 10 may be a CD drive. Storage device 9 may be a hard disk drive. Medium 11 may be a disc storing media data readable by media reader 10. Media data may comprise music data but is not limited thereto. Control module 8 comprises a control interface of embedded system 20. Duplication module 7 copies media data read by media reader 10 to storage device 9. Media player 6 plays media data. For example, media player 6 comprises a music player playing music data. The components of embedded system 20 can be implemented by computer programs or circuits.

Figure 2A:
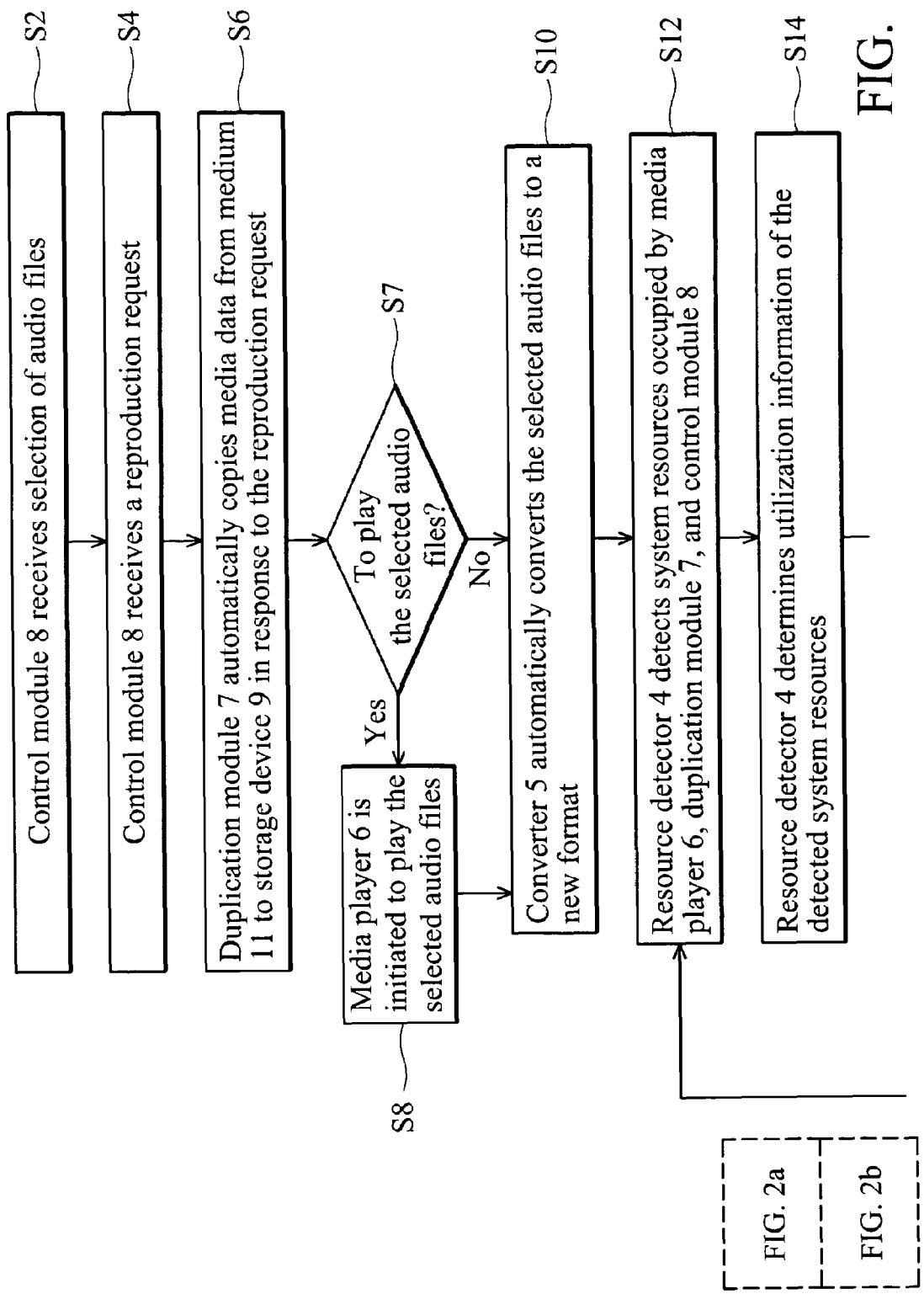
FIGS. 2a and 2b flowcharts of an exemplary embodiment of a media data reproduction method.
Figure 2B:
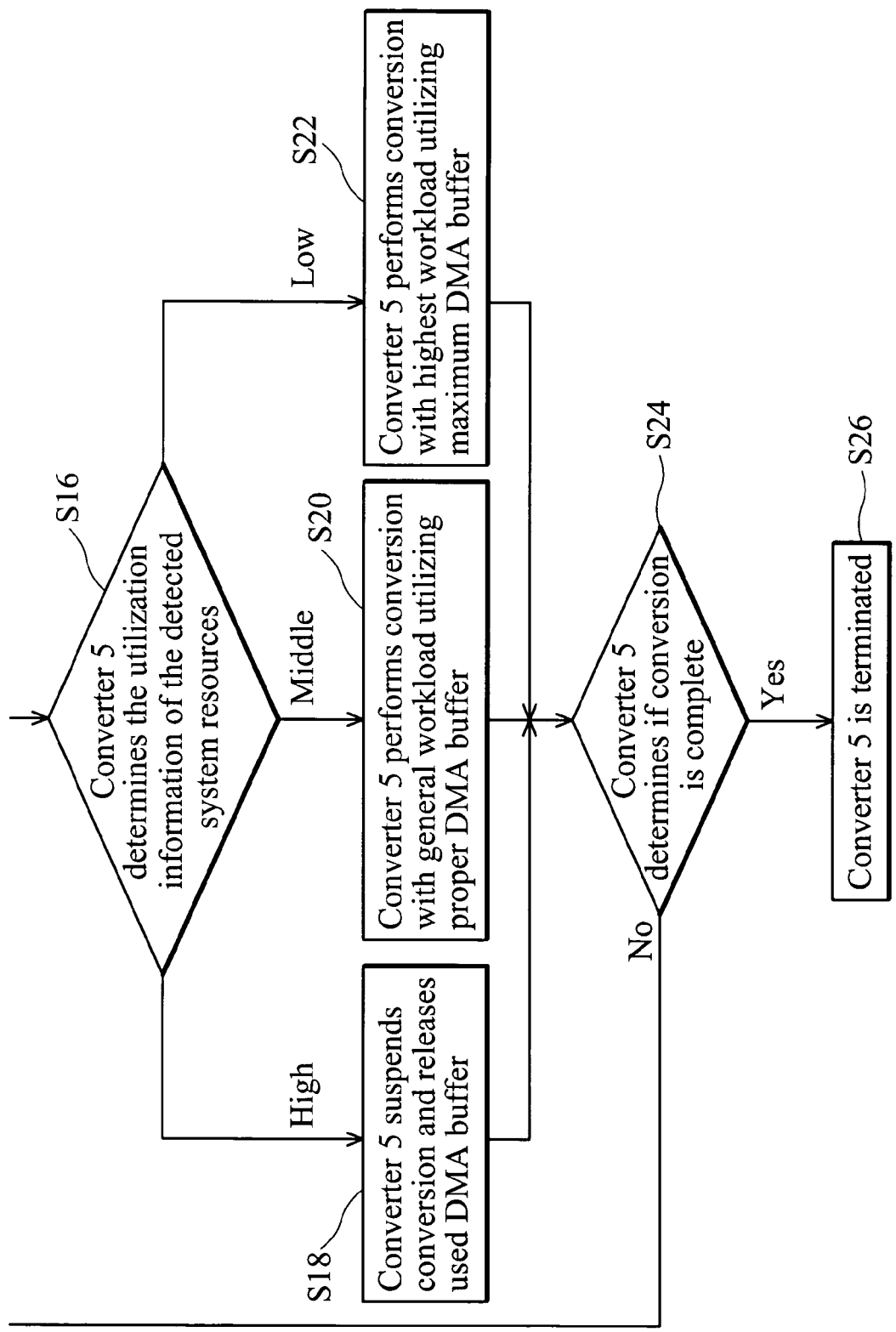

With reference to FIGS. 2a and 2B, an exemplary embodiment of a media data reproduction method is now described.

Control module 8 receives designation of audio files of medium 11 (step S2) and a reproduction request (step S4). Selected files may be some or all files in medium 11.

Duplication module 7 automatically copies media data from medium 11 read by media reader 10 to storage device 9 in response to the reproduction request (step S6). Whether the selected audio files are to be played is determined by the user's choice (step S7). If so, media player 6 may be automatically initiated to play the selected audio files in response to the reproduction request (step S8). If not, step S10 is performed directly.

Converter 5 converts the selected files from storage device 9 to a new format, such as mp3, wma, or other, based on the reproduction request (step S10).

During conversion, resource detector 4 detects system resources of embedded system 20 occupied by one or more running modules (comprising media player 6, duplication module 7, and control module 8) other than converter 5 during conversion (step S12), determines utilization information of the detected system resources (step S14), and transmits the utilization information to converter 5.

For example, system resources can comprise two major resources: utilization of processor 1, and the consumption rate of Direct Memory Access (DMA) buffer 3. Resource detector 4 calculates and categorizes the detected resources into levels. Table 1 illustrates three exemplary levels (the second to fourth fields in the first row) of an exemplary embodiment of an embedded system.

TABLE 1

| | System resource utilization level | | |
|---|---|---|---|
| | High | Middle | Low |
| Processor utilization | 50%~100% | 20%~50% | 0%~20% |
| DMA buffer utilization | DMA buffer consumption rate < sample rate | | DMA buffer consumption rate > sample rate |

When utilization information of the two major resources of embedded system 20 used by media player 6, duplication module 7, and control module 8 satisfies high level parameters, resource detector 4 determines that the system resources used by media player 6, duplication module 7, and control module 8 correspond to the high level. In other words, when processor utilization of embedded system 20 used by these modules is within 50%~100%, or the consumption rate of DMA buffer data used by media player 6 (DMA buffer consumption rate) is less than the rate of transmission sampled by media player 6 to DMA buffer 3 (sample rate), resource detector 4 determines that the system resources used by media player 6, duplication module 7, and control module 8 correspond to the high level. Otherwise, when utilization information of the two main resources of embedded system 20 used by media player 6, duplication module 7, and control module 8 satisfies parameters of the middle level, resource detector 4 determines that the system resources used by media player 6, duplication module 7, and control module 8 correspond to the middle level.

When system resources of embedded system 20 used by media player 6, duplication module 7, and control module 8 do not satisfy parameters of the high and middle levels, resource detector 4 determines that the system resources used by media player 6, duplication module 7, and control module 8 correspond to the low level.

Converter 5 determines the utilization information of the detected system resources (step S16) and dynamically adjusts workload (such as media data amount or frames to be converted in a certain time) of conversion based on the utilization information of the detected system resources, ensuring that system resources utilized by the converter 5 do not exceed system resources unused by media player 6 duplication module 7, and control module 8. Thus, the performance of music player 6 is prevented from influencing conversion. For example, when processor utilization of media player 6, duplication module 7, and control module 8 is 20%~50%, converter 5 maintains its processor utilization at less than 50%. Table 2 illustrates the relationships between operations of converter 5 and the detected system resources.

TABLE 2

| | System resource utilization level | | |
|---|---|---|---|
| | High | Middle | Low |
| Operations of converter 5 | Suspending conversion and releasing used DMA buffer | Performing conversion with proper workload and utilizing proper size of DMA buffer | Performing conversion with highest workload and utilizing maximum size of DMA buffer |

Converter 5 may dynamically adjust frames of media data to be converted per time unit based on the detected system resources. When the detected system resources correspond to the high level, converter 5 suspends conversion and releases used DMA buffer (step S18). When the detected system resources correspond to the middle level, converter 5 performs conversion with general workload utilizing proper DMA buffer (step S20). When the detected system resources correspond to the low level, converter 5 performs the conversion at the highest workload utilizing maximum DMA buffer (step S22).

Converter 5 determines if conversion is complete (step S24). If so, converter 5 is terminated (step S26). If not, step S12 is repeated.

Figure 3:
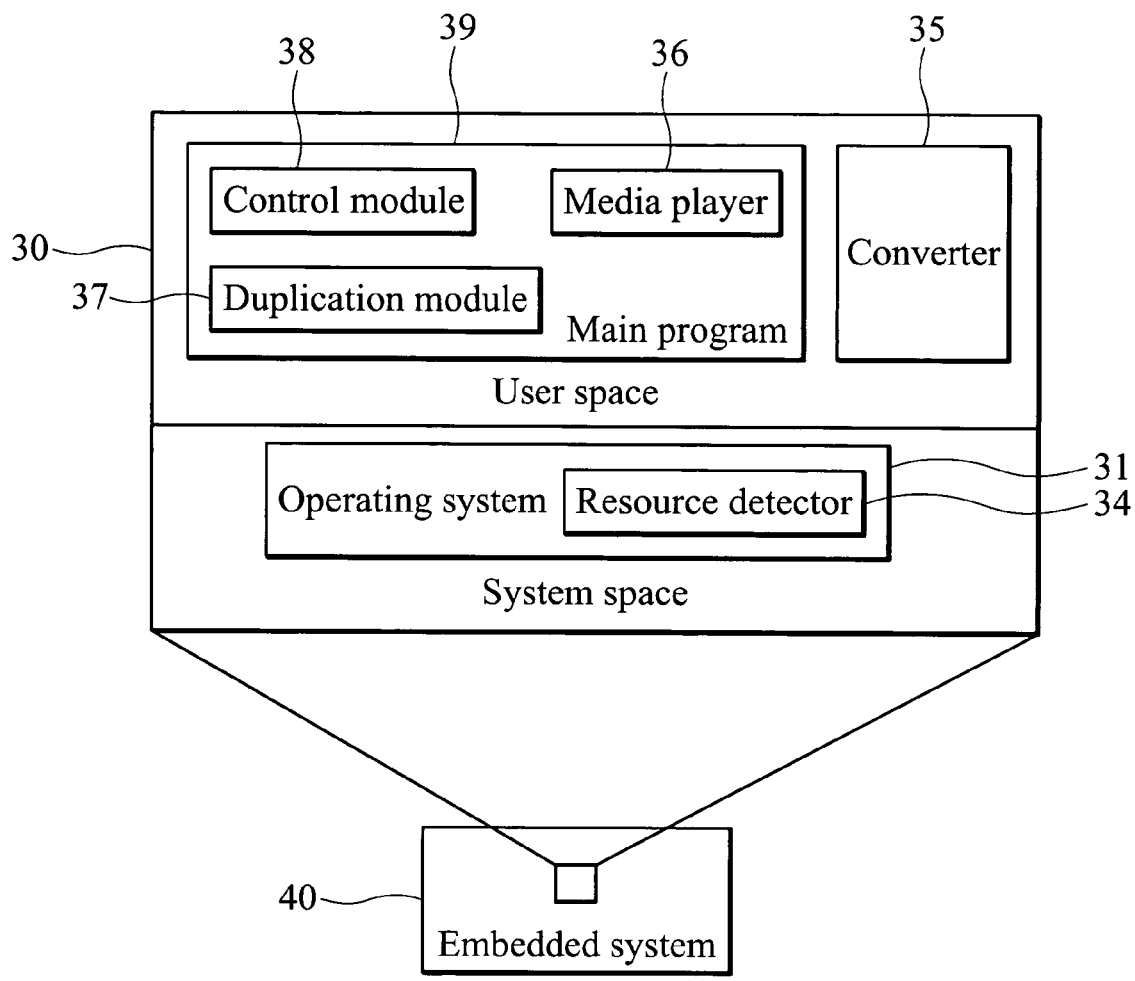
FIG. 3 is a schematic view showing a storage medium implementing a media data reproduction method.

The modules may be implemented by computer programs. As shown in FIG. 3, memory 30 of embedded system 40 comprises kernel space and user space. The kernel space comprises an operating system 31 which may comprise resource detector 34. The user space comprises a main program 39 comprising media player 36, duplication module 37, and control module 38. Main program 39 receives operating instructions and responds in real time. Resource detector 34, converter 35, media player 36, duplication module 37, and control module 38 can be stored in different storage media and respectively directs embedded system 40 to perform steps as implemented by resource detector 4, converter 5, media player 6, duplication module 7, and control module 8.

Thus, the media data reproduction method enables an embedded system to perform media data conversion in the background and media data duplication and playing in the foreground. Thus, media data playback is not delayed due to media data conversion.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A media data reproduction method, implemented in an embedded system comprising a media reader, a music player, a storage device, and a converter, comprising:
   receiving a reproduction request;
   automatically copying media data from storage media read by the media reader to the storage device in response to the reproduction request;
   converting, by the converter, the copied media data in the storage device to a new format;
   detecting system resources of the embedded system occupied by one or more modules other than the converter during conversion; and
   dynamically adjusting the workload of conversion based on the detected system resources to ensure that system resources utilized by the converter do not exceed system resources unused by the music player, wherein the detected system resources correspond to a plurality of levels comprising high, middle, and low levels, further comprising:
   when utilization information of the processor or Direct Memory Access (DMA) buffer satisfies parameters of the high level, determining that the detected system resources correspond to the high level, conversion of copied media data is suspended.

2. The method as claimed in claim 1, wherein the media data comprises audio data.

3. The method as claimed in claim 2, wherein dynamic adjustment comprises adjusting frames of media data to be converted per time unit based on the detected system resources.

4. The method as claimed in claim 3, wherein the detected system resources comprise the utilization information of a processor or the Direct Memory Access (DMA) buffer.

5. The method as claimed in claim 4, further comprising initiating the music player to respond to the reproduction request before converting the copied media data.

6. The method as claimed in claim 5, further comprising, when processor utilization of the embedded system is 50%~100%, or the ratio of data removal from the Direct Memory Access (DMA) buffer is lower than ratio of data transmission to the DMA buffer by the music player, determining that the detected system resources correspond to the high level.

7. The method as claimed in claim 5, further comprising ensuring that system resources utilized by the converter do not exceed system resources unused by the duplication module.

8. An embedded system, comprising:
   a media reader;
   a music player;
   a storage device;
   a control module receiving a reproduction request;
   a duplication module automatically copying media data from storage media read by the media reader to the storage device in response to the reproduction request;
   a converter converting the copied media data in the storage device to a new format;
   a resource detector detecting system resources of the embedded system occupied by one or more modules other than the converter during converting the copied media data, wherein the converter dynamically adjusts the workload of conversion based on the detected system resources to ensure that system resources utilized by the converter do not exceed system resources unused by the music player,
   wherein the detected system resources correspond to a plurality of levels comprising high, middle, and low levels, when utilization information of the processor or Direct Memory Access (DMA) buffer satisfies parameters of the high level, determining that the detected system resources correspond to the high level, conversion of copied media data is suspended.

9. The system as claimed in claim 8, wherein the media data comprises audio data.

10. The system as claimed in claim 9, wherein the converter dynamically adjusts frames of media data to be converted per time unit based on the detected system resources.

11. The system as claimed in claim 10, wherein the detected system resources comprise the utilization information of a processor or the Direct Memory Access (DMA) buffer.

12. The system as claimed in claim 11, wherein the music player is initiated to respond to the reproduction request before converting the copied media data.

13. The system as claimed in claim 12, further comprising, when processor utilization of the embedded system is 50%~100%, or ratio of data removal from the Direct Memory Access (DMA) buffer is less than the ratio of data transmission to the DMA buffer by the music player, the detected system resources are determined to correspond to the high level.

14. The system as claimed in claim 13, wherein the embedded system comprises an audio player.

15. The method as claimed in claim 1, further comprising:
   when the detected system resources do not satisfy the parameters of the high level, and the utilization information of the processor or the Direct Memory Access (DMA) buffer satisfies parameters of the middle level, determining that the detected system resources correspond to the middle level, conversion with general workload utilizing the corresponding DMA buffer is performed.

16. The method as claimed in claim 1, further comprising:
   when the detected system resources do not satisfy the parameters of the high and middle levels, determining that the detected system resources correspond to the low level, the conversion at the highest workload utilizing maximum DMA buffer is performed.

17. The system as claimed in claim 8, wherein when the detected system resources do not satisfy the parameters of the high level, and the utilization information of the processor or the Direct Memory Access (DMA) buffer satisfies parameters of the middle level, the detected system resources are determined to correspond to the middle level, and the converter performs conversion with general workload utilizing the corresponding DMA buffer.

18. The system as claimed in claim 8, wherein when the detected system resources do not satisfy the parameters of the high and middle levels, the detected system resources are determined to correspond to the low level, and the converter performs the conversion at the highest workload utilizing maximum DMA buffer.

* * * * *